United States Patent [19]
Spencer et al.

[11] Patent Number: 5,891,953
[45] Date of Patent: *Apr. 6, 1999

[54] PROCESS FOR PREPARING POLYALKENYL SUBSTITUTED MONO- AND DICARBOXYLIC ACID PRODUCING MATERIALS (PT-1302)

[75] Inventors: Jeremy R. Spencer, Didcot; Robert W. Russell, Abingdon, both of United Kingdom; Ronald P. Wangner, Garden City, N.Y.

[73] Assignee: Exxon Chemical Patents Inc, Linden, N.J.

[*] Notice: The term of this patent shall not extend beyond the expiration date of Pat. No. 5,777,025.

[21] Appl. No.: 785,206

[22] Filed: Jan. 17, 1997

Related U.S. Application Data

[63] Continuation-in-part of Ser. No. 599,220, Feb. 9, 1996.

[51] Int. Cl.$^6$ ..................................... C08K 5/01
[52] U.S. Cl. .......................... 524/745; 528/271; 528/481; 528/487; 528/492; 528/503; 528/745; 524/745
[58] Field of Search .................... 528/271, 481, 528/487, 492, 503; 524/745

[56] References Cited

U.S. PATENT DOCUMENTS

| | | | |
|---|---|---|---|
| 3,189,544 | 6/1965 | Ratner et al. | 252/33 |
| 3,324,033 | 6/1967 | Knapp | 252/51.5 |
| 3,367,943 | 2/1968 | Miller et al. | 260/326.3 |
| 3,819,660 | 6/1974 | Cahill et al. | 549/255 |
| 3,953,475 | 4/1976 | Puskas et al. | 260/346.8 R |
| 4,035,309 | 7/1977 | Brois | 252/49.7 |
| 4,086,251 | 4/1978 | Cengel et al. | 260/346.74 |
| 4,152,499 | 5/1979 | Boerzel et al. | 526/52.4 |
| 4,153,616 | 5/1979 | Powell et al. | 260/343.5 |
| 4,203,730 | 5/1980 | Hanson | 44/71 |
| 4,235,786 | 11/1980 | Wisotsky | 549/255 |
| 4,278,604 | 7/1981 | Powell | 260/346.74 |
| 4,325,876 | 4/1982 | Chafetz et al. | 260/346.74 |
| 4,388,471 | 6/1983 | Wollenberg | 549/255 |
| 4,587,304 | 5/1986 | Thaler et al. | 525/285 |
| 4,599,433 | 7/1986 | Bronstert et al. | 549/255 |
| 4,883,886 | 11/1989 | Huang | 549/255 |
| 5,071,919 | 12/1991 | DeGonia et al. | 525/285 |
| 5,229,022 | 7/1993 | Song et al. | 252/56 R |
| 5,277,833 | 1/1994 | Song et al. | 252/56 R |

FOREIGN PATENT DOCUMENTS

| | | |
|---|---|---|
| 0 355 895 | 2/1990 | European Pat. Off. . |
| 0 382 450 A2 | 8/1990 | European Pat. Off. . |
| 0 542 380 | 5/1993 | European Pat. Off. . |
| 0542380 | 5/1993 | European Pat. Off. . |
| 0 602 863 | 6/1994 | European Pat. Off. . |
| 0 623 631 | 11/1994 | European Pat. Off. . |
| 40 30 399 A1 | 4/1992 | Germany . |
| 4319671 | 12/1994 | Germany . |
| 4319672 | 12/1994 | Germany . |
| 1 483 728 | 8/1977 | United Kingdom . |
| 2 081 274 | 2/1982 | United Kingdom . |
| 2 081 722 | 2/1982 | United Kingdom . |
| WO94/19436 | 12/1993 | WIPO . |
| WO95/33806 | 12/1995 | WIPO . |

*Primary Examiner*—Samuel A. Acquah
*Attorney, Agent, or Firm*—K. R. Walton

[57] ABSTRACT

A low-sediment, low-tar, chlorine-free thermal process for preparing oil-soluble polyalkenyl derivatives of monounsaturated $C_3$–$C_{10}$ monocarboxylic acid producing compounds and monounsaturated $C_4$–$C_{10}$ dicarboxylic acid producing compounds is disclosed. The process involves reacting the mono- or dicarboxylic acid producing compound with a polyalkene at high temperature and under high inert gas partial pressure in the presence of a sediment-inhibiting amount of hydrocarbyl substituted sulfonic acid. The polyalkenyl derivatives are useful per se as additives in lubricating oils, functional fluids, and fuels and are also useful as intermediates in the preparation of other products (e.g., succinimides) useful as additives in lubricating oils, functional fluids, and fuels.

23 Claims, 3 Drawing Sheets

PROCESS FOR PREPARING POLYALKENYL SUBSTITUTED MONO- AND DICARBOXYLIC ACID PRODUCING MATERIALS (PT-1302)

CROSS REFERENCE TO RELATED APPLICATION

This is a continuation-in-part of U.S. Ser. No. 599,220, filed Feb. 9, 1996.

FIELD OF THE INVENTION

The invention relates to a low-sediment, low-tar, chlorine-free thermal process for preparing oil-soluble polyalkenyl derivatives of monounsaturated $C_3$–$C_{10}$ monocarboxylic acid producing compounds and monounsaturated $C_4$–$C_{10}$ dicarboxylic acid producing compounds by reacting the mono- or dicarboxylic acid producing compound with a polyalkene at high temperature and under high inert gas partial pressure in the presence of a sediment-inhibiting amount of hydrocarbyl substituted sulfonic acid. The polyalkenyl derivatives are useful per se as additives in lubricating oils, functional fluids, and fuels and are also useful as intermediates in the preparation of other products (e.g., succinimides) useful as additives in lubricating oils, functional fluids, and fuels.

BACKGROUND OF THE INVENTION

Polyalkenyl substituted mono- and dicarboxylic acid producing materials, most notably polyisobutenyl succinic acids and anhydrides, are known intermediates for the preparation of products useful as additives in lubricants, fuels, and functional fluids. In particular, succinamide and succinimide products produced by the reaction of monoamines or polyamines with polyalkenyl succinic anhydrides have been employed as ashless dispersants and detergent additives in lubricating oils and in fuels. Succinic esters produced by the reaction of monoalcohols or polyols with polyalkenyl succinic anhydrides have also been used as ashless dispersants and detergents.

Polyalkenyl substituted mono- and dicarboxylic acid producing materials have been prepared using a one-step chloro process in which a polyalkene and an unsaturated mono- or dicarboxylic acid producing compound are reacted at elevated temperature in the presence of chlorine. The polyalkenyl mono- or dicarboxylic acid materials have also been prepared using a two-step chloro process in which the polyalkene is chlorinated in the first step and the resulting chlorinated polyalkene is then reacted with the unsaturated mono- or dicarboxylic compound at elevated temperature. The one- and two-step chloro processes can produce polyalkenyl substituted mono- or dicarboxylic acid materials in relatively high yields and without the formation of substantial amounts of sediments and other undesirable byproducts. On the other hand, these products typically contain residual chlorine, and environmental concerns related to chlorine-containing materials make the use of the chloro processes undesirable.

The polyalkenyl substituted carboxylic materials can also be prepared by the direct thermal reaction of a polyalkene and an unsaturated mono- or dicarboxylic acid compound, often referred to in the art as the thermal ene process. While the thermal ene process has the advantage of avoiding the use of chlorine, the reaction tends to proceed only slowly and with low yields at reaction temperatures below about 150° C. At higher reaction temperatures, the thermal ene process typically has better yields, but it also tends to produce significant amounts of a sediment byproduct which must be filtered from the final product prior to its use as an additive or intermediate. The process also tends to produce tars, which coat the reactor walls, necessitating frequent, time-consuming, and therefore costly clean-ups of the reactor vessel. These sediments and tars are believed to be due at least in part to the decomposition and/or polymerization of the unsaturated mono- or dicarboxylic acid compound, which has typically been maleic anhydride.

Additives can be employed in the thermal ene reaction in order to reduce the formation of tars and sediments. For example, U.S. Pat. No. 4,235,786 discloses that sediment formation in the ene reaction can be markedly reduced by the presence of a sediment-reducing amount of an oil-soluble strong organic acid. The patent discloses that the oil-soluble strong organic acid is preferably a $C_{15}$–$C_{70}$ optimally $C_{28}$–$C_{36}$ hydrocarbyl substituted sulfonic acid. Example 1 discloses that a polyisobutylene having a number average molecular weight ("$\overline{M}_n$") of 900 was reacted with maleic anhydride at 235° C. for 6 hours under a pressure maintained at about 150 kPa in the presence of an alkylated benzene sulfonic acid having $\overline{M}_n$ of 500 and containing an average of about total 30 carbons. The resulting product had 0.2% sediment. The procedure of Example 1 was followed in Example 2 except that no sulfonic acid was present. The resulting product had 3.0% sediment, based upon which the patent discloses that it is apparent that the presence of about 0.13 wt.% of an acid reduced the sediment formation by 93%.

Improved thermal ene processes utilizing polyalkene reactants having a relatively high proportion of terminal double bonds have also been disclosed. Terminal double bonds, particularly terminal vinylidene bonds, in polyalkenes are recognized to be generally more reactive in the thermal ene process than internal double bonds. U.S. Pat. No. 4,152,499, for example, discloses that adduct formation between maleic anhydride and polyisobutene virtually only occurs between maleic anhydride and a terminal double bond. U.S. Pat. No. '499 further discloses that double bonds in the β position are also capable of reacting to a certain degree, while virtually no reaction occurs at double bonds further removed from the chain ends. U.S. Pat. No. 4,086,251 discloses that terminal vinylidene is believed to be the most reactive of the terminal double bonds in polybutenes. Conventional polyisobutenes, formed by cationic polymerization using aluminum chloride catalysts such as $AlCl_3$, generally have a relatively low content of terminal double bonds. Polyisobutenes having a high content of terminal double bonds, so-called "reactive" polyisobutenes, have been achieved by $BF_3$-catalyzed polymerization of isobutene. Other polyalkenes having a high content of terminal double bonds (e.g., ethylene-α-olefin copolymers and α-olefin homo- and copolymers) have been disclosed to be prepared by polymerization of the corresponding monomers in the presence of metallocene catalyst systems.

The improved thermal ene processes utilizing these more reactive polyalkenes have been disclosed to provide products with low sediment and/or low tar. For example, U.S. Pat. No. 5,071,919 discloses a process for preparing substituted succinic acylating agents by reacting an acidic reactant such as maleic anhydride with a substantially aliphatic polymer comprised principally or entirely of polyisobutenes in a mole ratio of acidic reactant:polymer of at least 1:1, provided that at least 50% of the polyisobutene content of the polymer has terminal vinylidene end groups and the reaction is maintained under superatmospheric pressure during at least a substantial portion of the reaction period. The patent discloses that reaction product mixtures formed by this process contain little or no tars. Another example is U.S. Pat. No. 5,229,022 which discloses the thermal ene reaction of ethylene-α-olefin polymers having a high terminal ethenylidene (i.e., vinylidene) content with monounsaturated carboxylic reactants. The patent discloses that the ethylene-α-olefin polymers readily undergo thermal ene reactions under conditions in which the formation of sediment or other byproducts contributing to product haze is greatly minimized or avoided altogether. It is further disclosed that the resulting ene reaction product mixture can be employed, without filtering, centrifuging, clarification, phase separation or other conventional product purification treatments.

There is a continuing need for the development of improved thermal ene processes. In particular, while prior art processes employing tar suppressants and sediment inhibitors have reduced the amount of sediments and/or tars, they have not generally not eliminated their formation, particularly as applied to polyalkenes having a low content of terminal vinylidene polymer chains. Accordingly, the products resulting from these processes still typically require treatment to remove sediments and the reaction vessels must still be cleaned regularly to remove tars.

SUMMARY OF THE INVENTION

The present invention is a process for preparing a polyalkenyl derivative of a carboxylic acid producing compound selected from the group consisting of monounsaturated $C_3$ to $C_{10}$ monocarboxylic acid producing compounds and monounsaturated $C_4$ to $C_{10}$ dicarboxylic acid producing compounds, the process comprising the step of reacting the carboxylic acid producing compound with a polyalkene having a number average molecular weight of from about 300 to 5000 in the presence of a sediment-inhibiting amount of an oil soluble hydrocarbyl substituted sulfonic acid at a reaction temperature of from about 200 to 300° C. under an inert gas partial pressure in the range of from about 200 to 1000 kPa and in a mole ratio of carboxylic acid producing compound to polyalkene of from about 0.9:1 to 3:1. The process is a low tar, low sediment process, which means it is characterized by little to no formation of tar and sediments. In one aspect, the process is characterized by the substantial absence of tar formation and the polyalkenyl derivative is characterized by containing sediment in an amount of no more than about 0.1 volume percent.

In one embodiment, the present invention is a process for preparing a polyalkenyl derivative of a monounsaturated $C_4$ to $C_{10}$ dicarboxylic acid producing compound, the process comprising the step of reacting the monounsaturated $C_4$ to $C_{10}$ dicarboxylic acid producing compound with a polyalkene having a number average molecular weight of from about 300 to 5000 in the presence of a sediment-inhibiting amount of an oil soluble hydrocarbyl substituted sulfonic acid at a reaction temperature of from about 200 to 300° C. under an inert gas partial pressure in the range of from about 200 to 1000 kPa and in a mole ratio of monounsaturated dicarboxylic acid producing compound to polyalkene of from about 0.9:1 to 3:1, the process being characterized by the substantial absence of tar formation and the polyalkenyl derivative being characterized by containing sediment in an amount of no more than about 0.1 volume percent.

In a preferred embodiment of the invention, the process further comprises the steps of providing a mixture of the polyalkene and the oil soluble hydrocarbyl substituted sulfonic acid at reaction temperature, and then adding the carboxylic acid producing compound (e.g., monounsaturated dicarboxylic acid producing compound) to the mixture while maintaining the reaction temperature.

The process of the invention has the surprising and unexpected advantage of producing polyalkenyl derivatives containing at most such insignificant amounts of sediment that no treatment (i.e., filtration, centrifuging, and the like) of the derivative product is required for its further use as an additive per se or as an intermediate in the preparation of other products useful as additives in lubricants, fuels, and functional fluids. The process of the invention also surprisingly and unexpectedly produces such small amounts of tar that the reaction vessel requires at most infrequent cleaning. The process has been found to achieve these results both for polyalkenes having relatively low levels of terminal vinylidene unsaturation (e.g., conventional polyisobutene) and for polyalkenes containing relatively high levels of terminal vinylidene unsaturation (reactive polyalkenes). An additional benefit is that the process achieves the foregoing benefits without reliance on halogen; i.e., without employing halogen (e.g., chlorine) or a halogen-containing compound as a catalyst, which avoids the environmental concerns associated with halogen.

DETAILED DESCRIPTION OF THE INVENTION

Figure 1:
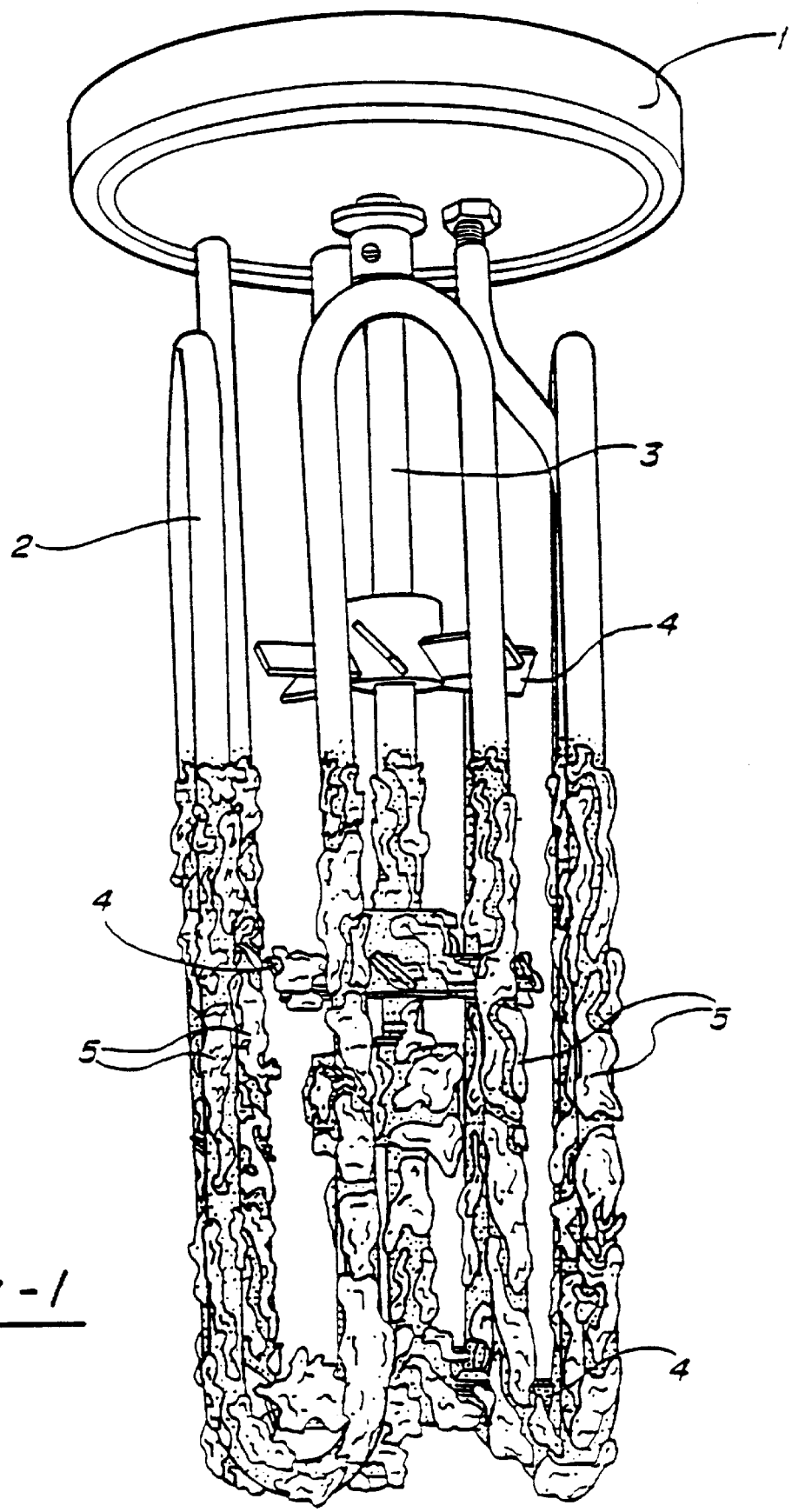
FIG. 1 shows the tar deposits on the reactor internals at the conclusion of the reaction described in Example 1.

The process of the invention involves the reaction of a polyalkene with a monounsaturated mono- or dicarboxylic acid producing compound at high temperature under a high inert gas partial pressure in the presence of a sediment-inhibiting amount of hydrocarbyl substituted sulfonic acid. The reaction proceeds by the addition of the mono- or dicarboxylic acid producing reactant to the polyalkene with the monounsaturation in the mono- or dicarboxylic reactant becoming saturated.

The polyalkene employed in the process of the invention can be any polyalkene homopolymer, polyalkene copolymer, or mixtures thereof, including polyalkenes derived from polymerizable mono-, di- and multi-olefin monomers of 2 to 18 carbon atoms. Preferred polyalkenes are homopolymers and copolymers derived from $C_2$ to $C_8$ monoolefins, and more preferably derived from $C_2$ to $C_6$ monoolefins (e.g., ethylene, propene, butene-1, isobutene, 3-methylbutene-1, pentene-1, and hexene-1). Suitable homopolymers include polyethylene, polypropylene, polyisobutene, and polybutene-1. Suitable copolymers include ethylene-propene copolymer, ethylene-butene-1 copolymer, and butene-1-propene copolymer. Also suitable are polybutene copolymers of the $C_4$ monoolefins isobutene, butene-1, and butene-2, which copolymers are alternatively and more simply hereinafter referred to as polybutenes. Polybutene is conveniently prepared by the cationic polymerization of mixed $C_4$ streams typically taken from either catalytic cracking units or steam cracking units and typically containing a major amount of isobutene and smaller amounts of the other butenes. Normally all of the isobutene is polymerized with a lower conversion of the other $C_4S$, such that the resulting polybutene typically contains up to about 40% of monomer units derived from butene-1 and butene-2, but often contains much fewer (e.g., less than 20%) butene-1- and butene-2-derived units. Other suitable copolymers include those in which a minor amount of the copolymer (e.g., 1 to 20 mole%) is derived from a $C_4$ to $C_{18}$ nonconjugated diolefin such as EPDM. EPDM copolymers include copolymers of ethylene and propylene with dicyclopentadiene, with ethylidene norbornene and with 1,4-hexadiene.

While the polyalkenes are generally hydrocarbon polyalkenes, suitable polyalkenes can contain non-hydrocarbon moieties such as lower alkoxy (lower is defined as groups having up to 7 carbon atoms), lower alkyl mercapto, hydroxy, mercapto and carbonyl, provided that the non-hydrocarbon moieties do not substantially interefere with the process of the invention; i.e., they do not interfere with the thermal ene reaction between the polyalkene and the monounsaturated mono- or dicarboxylic acid producing compound. The non-hydrocarbon moieties can be introduced into the polyalkene by employing polymerizable olefin monomers containing non-hydrocarbon substituents in the preparation of the polyalkene.

The polyalkenes have a number average molecular weight in the range of from about 300 to 5000 (e.g., 700 to 5000), preferably from about 300 to 3000 (e.g., 700 to 2500), and more preferably from 400 to 2500 (e.g., 400 to 1200). $\overline{M}_n$ can be determined by several known techniques such as gel permeation chromatography ("GPC"), vapor phase osmometry, proton NMR and carbon-13 NMR. GPC additionally provides molecular weight distribution ("MWD") information, also referred to in the art as polydispersity, which is detemined by the ratio of weight average molecular weight ("$\overline{M}_w$") to $\overline{M}_n$. MWD is not a critical aspect of the starting hydrocarbon polymer for the process of this invention. Typically, however, the polyalkenes have MWD of less than about 6.

The polyalkenes can be further characterized by their terminal vinylidene content. A polyalkene chain having a terminal vinylidene group (also referred to in the art as a terminal ethenylidene group) can be represented as POLY—C(R)=CH$_2$, wherein R is an alkyl group whose identity depends upon the monomer units from which the polyalkene is derived (e.g., R is methyl for polyisobutene) and POLY is the remainder of the polyalkene chain. The percentage of the polymer chains having terminal vinylidene and the percentages of other types of olefin unsaturation can be determined by proton or carbon-13 NMR. Polyalkenes having at least about 30% (e.g., 40 to 100%) terminal vinylidene chains are referred to herein as reactive polyalkenes, because such polyalkenes tend to have a higher reactivity when employed in a thermal ene process, relative to the analogous polyalkenes having less than about 30% (e.g., 1 to 20%) terminal vinylidene chains; i.e., polyalkenes with a low (less than about 30%) terminal vinylidene content tend to have a lower degree of conversion than reactive polyalkenes under analogous reaction conditions. Thus, reactions of polyalkenes with low terminal vinylidene content typically require longer reaction times and/or higher reaction temperatures to achieve significant conversion to the desired polyalkenyl derivative products, as a result of which the reactions are often accompanied by the formation of more sediment and tar than the reactions of the analogous reactive polyalkenes. In any event, both groups of polyalkenes are suitable for use in the process of the invention; i.e., the process of the invention results in the reduction or elimination of sediment and tar formation, as applied to polyalkenes having either a low (less than about 30%) or a high (at least about 30%) content of terminal vinylidene chains.

Preferred polyalkenes include polyisobutenes (i.e., homopolymers of isobutene) and polybutenes. The polyisobutenes and polybutenes can be reactive polyisobutenes and reactive polybutenes, i.e., those having at least about 30% terminal vinylidene chains. The reactive polyisobutenes and polybutenes preferably have at least about 50% (e.g., 50 to 95%) and more preferably at least about 60% (e.g., 60 to 99%) terminal vinylidene chains. The polyisobutenes and polybutenes can also have less than about 30% terminal vinylidene chains and are referred to herein and in the art as conventional polyisobutenes and conventional polybutenes. The conventional polyisobutenes and polybutenes are typically prepared by polymerizing the corresponding monomers using an aluminum chloride or organoaluminum chloride catalyst and typically have less than about 20% (e.g., 1 to 20%) and more typically less than about 15% (e.g., 1 to 15%) terminal vinylidene chains. Particularly preferred polyisobutenes and polybutenes, whether reactive or conventional, are those having $\overline{M}_n$ of from about 300 to 3500, preferably from about 300 to 2500, more preferably from about 400 to 1500, and most preferably from about 400 to 1200 (e.g., 400 to 1000).

Other preferred polyalkenes are the α-olefin homopolymers, α-olefin copolymers, and ethylene-α-olefin copolymers. The unsaturated α-olefin homo- and copolymers are respectively polymers of one and of at least two $C_3$ to $C_{12}$ α-olefin(s) having the formula CH$_2$=CHR' wherein R' is a straight or branched chain alkyl radical comprising 1 to 10 carbon atoms. The unsaturated ethylene-α-olefin copolymers are polymers of ethylene and at least one α-olefin of the above formula. The α-olefins employed in the foregoing homo- and copolymers are more preferaby selected from the $C_3$ to $C_6$ α-olefins of the above formula, R' being a straight or branched chain alkyl of from 1 to 4 carbon atoms. Accordingly, useful α-olefin monomers and comonomers include, for example, propene, butene-1, hexene-1, octene-1, 4-methylpentene-1, decene-1, dodecene-1, and mixtures thereof (e.g., mixtures of propene and butene-1). Exemplary of such polymers are propene homopolymers, butene-1 homopolymers, ethylene-propene copolymers and the like. Preferred polymers are those derived from ethylene and the $C_3$ and $C_4$ α-olefins of the above formula; i.e., polyethylene, polypropene, polybutene-1, and copolymers of ethylene and propene, ethylene and butene-1, butene-1 and propene, and ethylene and propene and butene-1.

The molar ethylene content of the unsaturated ethylene copolymers employed in the process of this invention is preferably in the range of from about 20 to 80%, and more preferably from about 30 to 70%. When propene and/or butene-1 are employed as the comonomer(s) with ethylene, the ethylene content of such copolymers is most preferably between about 45 and 65%, although higher or lower ethylene contents may be present.

Particularly preferred unsaturated α-olefin homopolymers, α-olefin copolymers, and ethylene-α-olefin copolymers are the reactive homo- and copolymers; i.e., those in which at least about 30% of the polymer chains possess terminal vinylidene bonds. Preferably, at least 50%, more preferably at least 60%, and most preferably at least 75% (e.g., 75 to 98%) of such polymer chains exhibit terminal vinylidene unsaturation.

The reactive α-olefin homopolymers, α-olefin copolymers, and ethylene-α-olefin copolymers just described may be prepared by polymerizing an α-olefin monomer, or mixtures of α-olefin monomers, or mixtures comprising ethylene and at least one α-olefin monomer, in the presence of a catalyst system comprising at least one metallocene (e.g., a cyclopentadienyl-transition metal compound) and an aluminoxane compound. Suitable methods for preparing these polymers are disclosed in, for example, U.S. Pat. No. 5,266,223 and U.S. Pat. No. 5,225,092. Reactive ethylene-α-olefin copolymers may be characterized by the formula POLY—C(R')=CH$_2$ wherein R' is as defined earlier and wherein POLY represents the polymer chain. The chain length of the R' alkyl group will vary depending upon the comonomer(s) selected for use in the polymerization. A minor amount of the polymer chains can contain terminal ethenyl (i.e., vinyl) unsaturation, i.e., POLY—CH=CH$_2$, and a portion of the polymers can contain internal monounsaturation, e.g., POLY—CH=CH(R').

The carboxylic reactant employed in the process of the invention is a monocarboxylic reactant or a dicarboxylic reactant. The monocarboxylic reactant is at least one $C_3$ to $C_{10}$ monounsaturated monocarboxylic acid producing compound and is generally selected from $C_3$ to $C_{10}$ monounsaturated dicarboxylic acids and esters derived therefrom. The monounsaturated monocarboxylic compound is typically selected from the group consisting of (i) monounsaturated $C_3$ to $C_{10}$ monocarboxylic acids wherein the carbon-carbon double bond is allylic to the carboxy group; i.e., of the structure —C=C—C(=O)—, and (ii) esters of (i) derived from $C_1$ to $C_5$ alcohols. Exemplary monocarboxylic reactants are acrylic acid, methacrylic acid, cinnamic acid, crotonic acid, isocrotonic acid, and the $C_1$ to $C_5$ alkyl esters of the foregoing (e.g., methyl acrylate, methyl methacrylate, ethyl acrylate, and the like).

The dicarboxylic reactant employed in the process of the invention is at least one $C_4$ to $C_{10}$ monounsaturated dicarboxylic acid producing compound and is generally selected from $C_4$ to $C_{10}$ monounsaturated dicarboxylic acids, and the esters and anhydrides derived therefrom. The monounsaturated dicarboxylic compound is typically selected from the group consisting of (i) mornounsaturated $C_4$ to $C_{10}$ dicarboxylic acids wherein the carboxylic groups are vicinal (i.e., located on adjacent carbon atoms) and at least one of the adjacent carbon atoms is part of the monounsaturation, (ii) anhydride derivatives of (i), and (iii) mono- or di-esters of (i) derived from $C_1$ to $C_5$ alcohols. Exemplary dicarboxylic reactants are maleic acid, citraconic acid, ethyl maleic acid, itaconic acid, $C_1$ to $C_5$ alkyl (i.e., methyl, ethyl, propyl, etc.) esters of the foregoing acids, and maleic anhydride. Dicarboxylic reactants are preferred. The preferred dicarboxylic reactant is maleic anhydride.

The process of the invention employs an oil soluble hydrocarbyl substituted sulfonic acid as a sediment inhibitior. The term "oil soluble" refers here to a hydrocarbyl substituted sulfonic acid which is at least 50 wt.% soluble in mineral oil at 20° C. The hydrocarbyl sulfonic acid may be a natural or synthetic sulfonic acid, such as a mahogany or petroleum alkyl sulfonic acid, an alkyl sulfonic acid or an alkaryl sulfonic acid, wherein the hydrocarbyl substituent (i.e., petroleum alkyl, linear and/or branched chain alkyl, alkaryl, and the like) imparts the oil solubility. Oil-soluble mahogany acids may be obtained by treating lubricating oil basestocks with concentrated or fuming sulfuric acid.

The hydrocarbyl substituent of the sulfonic acid can contain non-hydrocarbon groups such as nitro, amino, halo (e.g., chloro or bromo), lower alkoxy, lower alkyl mercapto, oxo (=O), thio (=S), imino (—NH—), ether (—O—), and thioether (—S—), provided the essentially hydrocarbon character of the substituent is retained for the purposes of this invention. When such non-hydrocarbon groups are present, they will generally represent no more than about 10 wt.% of the total weight of the atoms in the hydrocarbyl substituent.

The preferred hydrocarbyl substituent is alkaryl, and the preferred sulfonic acids are accordingly alkaryl sulfonic acids. Alkaryl sulfonic acids can be obtained by sulfonating alkyl substituted aromatic hydrocarbons such as those obtained from the fractionation of petroleum by distillation and/or extraction, or by the alkylation of aromatic hydrocarbons as, for example, those obtained by alkylating benzene, toluene, xylene, naphthalene, and biphenyl. Preferred alkaryl sulfonic acids include those obtained by the sulfonation of hydrocarbons prepared by the alkylation of benzene or toluene with tri-, tetra- or pentapropene fractions resulting from propene polymerization.

The alkaryl sulfonic acids typically contain from 15 to 76, preferably from 24 to 40, and more preferably from 28 to 36 total carbon atoms. The aryl moiety can be derived from any aromatic hydrocarbon such as benzene, napthalene, anthracene, biphenyl, and the like, but is preferably derived from benzene or naphthalene, and is most preferably derived from benzene. The preferred alkyl benzenesulfonic acids typically contain from 9 to 70, preferably from 18 to 34, more preferably from 22 to 30 total carbon atoms in the alkyl substitutent (or substituents) in the aryl moiety. Particularly preferred is an alkylated benzenesulfonic acid having a $\overline{M}_n$ of from 475 to 600 and an average of 2 alkyl groups wherein each of the alkyl groups contains an average of 11 to 15 carbon atoms.

The alkylated benzene used for preparing the sulfonic acid is obtained by known alkylation processes; e.g., the benzene can be reacted with a suitable alkene or oligomer or polymer thereof in the presence of boron trifluoride. Among the $C_9$ to $C_{70}$ alkylated benzenes which are preferably employed in the preparation of the sulfonic acid are nonylbenzene, dodecylbenzene, waxy alkylated benzenes, and benzenes alkylated with suitable branched chain polymers of up to 70 carbon atoms obtained from propene, butene, amylene or mixtures thereof or the like. Preferably, nonyl or dodecyl or either of their equivalents in a mixture of alkyls is employed in the preparation of the sulfonic acid.

The hydrocarbyl substituted sulfonic acid is used in an amount which is effective for preventing or substantially reducing the formation of sediments for the selected reaction time and conditions. The amount of sulfonic acid employed in the present invention is typically in the range of from about 0.05 to 1.0 wt.%, preferably 0.15 to 0.5 wt.% based on the total weight of the polyalkene and the mono- or dicarboxylic reactants.

The reaction between the polyalkene and the monounsaturated mono- or dicarboxylic reactant is conducted in the presence of the sulfonic acid at a temperature of from about 200 to 300° C., preferably from about 210 to 250° C., and most preferably from about 225 to 245° C. (e.g., 230 to 240° C.) under an inert gas partial pressure of from about 200 to 1000 kPa (gauge) (e.g., 200 to 700 kPa) and preferably from about 400 to 700 kPa. Unless otherwise indicated, all pressures disclosed herein are in gauge. The inert gas can be any gas which does not interfere with the thermal ene reaction under the selected reaction time and conditions. The gas is typically selected from one of the noble gases (i.e., helium, neon, and argon, etc.), nitrogen, carbon dioxide, and carbon monoxide. The preferred inert gases are nitrogen and $CO_2$, and nitrogen is the most preferred. Because gaseous byproducts and/or gasesous decomposition products of the reactants usually, though not always, form during the course of the reaction (e.g., $CO_2$ from the decomposition of maleic anhydride), the total system pressure is typically higher than the inert gas partial pressure.

The reaction time can vary greatly depending upon such factors as the reactivity of the polyalkene, the degree of conversion desired, the selected reaction temperature, and so forth. Nonetheless, the reaction time is generally in the range of from about 1 to 30 hours, and is more typically from about 2 to 10 hours (e.g., 4 to 8 hours).

The polyalkene and monounsaturated mono- or dicarboxylic compound are reacted together in a mole ratio of monounsaturated mono- or dicarboxylic acid producing compound to polyalkene of from about 0.9:1 to 3:1 (e.g., 1:1 to 2:1), and preferably in a mole ratio of from about 1.1:1 to 1.5:1 (e.g., 1.1:1 to 1.4:1). The use of mole ratios below 3:1 in the process of the invention is necessary in order to inhibit the formation of tar.

The process of the invention can be conducted in batch, staged or continuous reactors, but is preferably run in a pressure reactor. In one embodiment of the process, a mixture of the polyalkene, monounsaturated mono- or dicarboxylic acid compound, and the hydrocarbyl substituted sulfonic acid is introduced into the reactor below the reaction temperature, after which the reactor is pressurized with the inert gas to the selected inert gas partial pressure and sealed. The reactor is then brought to and maintained at the selected reaction temperature for the selected reaction time, usually with continual stirring. The mixture of reactants and sulfonic acid can be introduced into the reactor in any convenient manner prior to pressurizing and heating to reaction temperature. For example, they can be individually charged to the reactor concurrently or sequentially in any order; or they can be mixed together in a separate mixing vessel, followed by charging the mixture to the reactor; or a mixture of the polyalkene and sulfonic acid can be charged separately to the reactor, either concurrently with the charging of the mono- or dicarboxylic acid producing compound or sequentially in either order. However introduced, the polyalkene is normally in liquid form (e.g., polyalkenes which are normally solid at room temperature are introduced as a melt at higher temperatures) and the sulfonic acid is typically employed as a solution in oil (e.g., mineral oil) in order to facilitate their mixing with each other.

In a preferred embodiment, the mono- or dicarboxylic acid producing compound is added to the reactor after a mixture of the polyalkene and sulfonic acid are introduced therein and brought to reaction temperature, with the mixture being maintained at or near (e.g., within 10° C. on reaction temperature during the addition of the mono- or dicarboxylic compound. Upon completing the addition of the mono- or dicarboxylic compound, the reactor is pressurized with inert gas and held at reaction temperature for the selected reaction time.

At the conclusion of the reaction, the resulting product mixture is normally treated to remove any unreacted mono- or dicarboxylic acid producing compound and/or volatile byproducts or decomposition products, such as by nitrogen stripping or by distillation with or without a vacuum. The product mixture typically consists of the desired polyalkene derivative (i.e., polyalkenyl substituted mono- or dicarboxylic acid producing material) and at least some unfunctionalized polyalkene. The unfunctionalized polyalkene is normally not removed from the product mixture, because such removal is difficult and would be expensive to achieve on a commercial scale.

The product mixture can be characterized in terms of its functionality, which is the average number of moles of monounsaturated mono- or dicarboxylic reactant which have reacted per mole of polyalkene charged to the reaction, whether it has undergone functionalization or not. Functionality is based upon the saponification number ("SAP") of the product mixture and the $\overline{M}_n$ of the polyalkene charged. SAP is the number of milligrams of KOH consumed in the complete neutralization of one gram of the resulting product mixture, and can be determined using ASTM D94. The average number of succinic groups per mole of product mixture obtained when reacting maleic anhydride with polyalkene is determined using the following formula: [SAP× $\overline{M}_n$]/[112,200−(SAP×98)].

The functionality of the polyalkenyl derivatives resulting from the process of the invention is typically at least about 0.5 and preferably at least about 0.7 (e.g., at least about 0.9). Functionality is typically in the range of from about 0.7 to 2 (e.g., 0.9 to 2). In one preferred embodiment the functionality is in a range from about 1 to 2 and preferably from about 1.1 to 1.5 (e.g., 1.1 to 1.4).

The product mixture can also be characterized in terms of its active ingredient ("AI"), which is the weight fraction of reacted polyalkene based on the total weight of reacted and unreacted polyalkene. The AI of the resulting product mixture is typically at least about 0.65 (e.g., 0.65 to 0.80), preferably at least about 0.75 (e.g., 0.75 to 0.90), more preferably at least about 0.80 (e.g., 0.85 to 0.99). AI can be determined by separating the functionalized and unfunctionalized polymer components using column chromatography and then determining the weight fractions of the separated components.

The product mixture has little or no sediment. More particularly, the product typically has about 0.1 vol.% or less sediment and preferably less than 0.05 vol.% sediment (e.g., 0.01 to 0.05 vol.% sediment), as measured by dissolving or diluting 50 ml of the product in 50 ml of heptane, placing the solution in a calibrated centrifuge tube, centrifuging the tube for 20 minutes at a speed sufficient to give a relative centrifugal force of about 500 at the tip of the tube, and thereafter measuring the volume of sediment in the calibrated tube. The resulting product mixture normally has such insubstantial amounts of sediment that it can be used as an additive or a chemical intermediate without treatment to remove the sediment.

Figure 3:
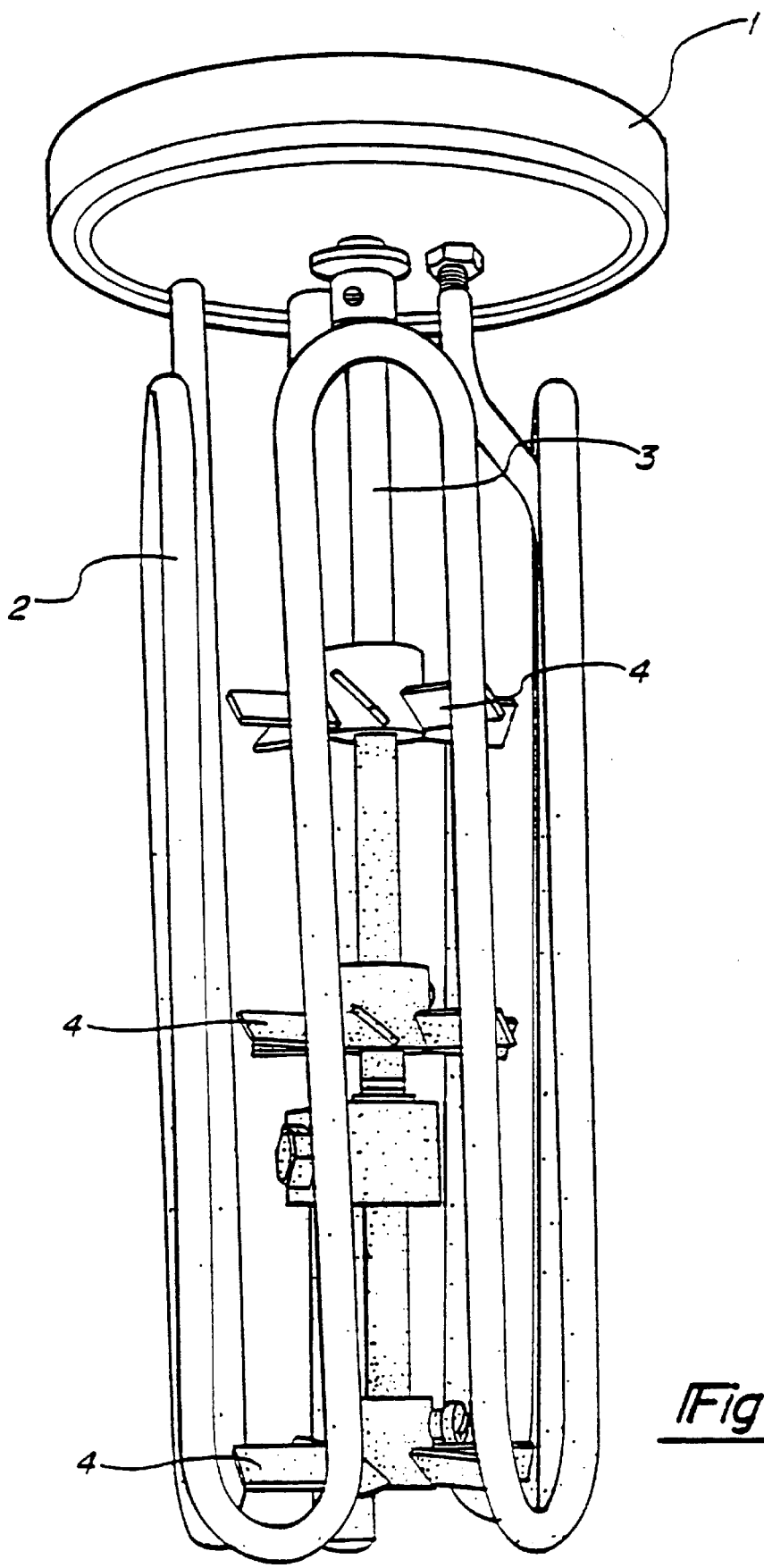
FIG. 3 shows the varnish on the reactor internals at the conclusion of the reaction described in Example 3.

The process of the invention is characterized by the substantial absence of tar formation. As used herein, the substantial absence of tar formation refers to a reactor whose surfaces forming the reaction zone (including reactor walls and internals such as stirrers, piping and the like) can be characterized at the conclusion of the reaction as having from no observable tar present thereon to having a varnish (which can alternatively be referred to as a discoloration) present on a minor portion (i.e., no more than about 50% and typically no more than about 25%) of the reaction zone surfaces. FIG. 3 (described below under Example 3) exemplifies a reactor which has been employed in the process of the invention and which is clean except for this varnish.

The products of the process of the invention are useful per se as additives in lubricating oils, fuels, and functional fluids, but are more typically employed as intermediates for producing additives. The polyalkenyl derivatives can, for example, be reacted with monoamines, polyamines, monoalcohols, polyols, and/or amino alcohols to form products having nitrogen-containing functional groups (e.g., amides or imides) and/or ester functional groups, which products are useful as dispersants or detergents in lubricating oils, fuels, power transmission fluids, gear oils, and the like.

EXAMPLES

The following examples serve to illustrate, but not limit the scope of, the process of the invention. All pressures are reported in gauge. Values given for the comonomer content and terminal vinylidene content of polymers are based on carbon-13 NMR. The 450 $\overline{M}_n$ polybutene employed in certain of the examples has less than 10% terminal vinylidene.

Example 1 (Comparative)

700 grams of polybutene with $\overline{M}_n$ of about 450 (nitrogen-stripped for about one hour at 120° C. to remove any residual moisture) and 213.4 grams of maleic anhydride were charged to a stainless steel Parr autoclave reactor (2 liter capacity) and then heated under a nitrogen blanket to 220° C. with stirring at a speed of 300 revolutions per minute, after which the reactor was sealed. The reaction mixture was maintained with stirring at about 220° C. for six hours, during which time the total system pressure increased from about 0 kPa (0 psig) to about 760 kPa (110 psig) after three hours and to about 966 kPa (140 psig) after six hours. The reactor was subsequently cooled to 60° C., the system pressure was vented, and the reactor contents discharged. The discharged reactor contents were stripped with nitrogen for one hour at 130° C. to remove unreacted maleic anhydride. The stripped product mixture containing less than 0.1 wt.% maleic anhydride was found to have a saponification number of 147.6, a sediment content of 3.0 vol.%, kinematic viscosity at 100° C. of 64.33 centistokes, and an ASTM D1500 color rating of lighter than 6.0. The reactor had a heavy tar deposit almost entirely covering its walls and internals. FIG. 1 is a drawing of the post-reaction reactor internals (including head 1, cooling water tube 2, and central stirrer shaft 3 having three turbine blades 4) subsequent to discharge of the reactor contents. FIG. 1 shows heavy tar deposits 5 on the internals. The tar was removed from the reactor internals and walls by dissolution with a solvent cleaner sold under the tradename Decon 90 by Decon Laboratories Limited (United Kingdom), which is an emulsion containing anionic and non-ionic surface active agents, stabilizing agents, alkalis, non-phosphate detergent buliders and sequestering agents in an aqueous base. Following dissolution, the solvent cleaner was evaporated and the residue dried at 100° C. leaving 62 grams of tar residue.

Example 2 (Comparative)

Figure 2:
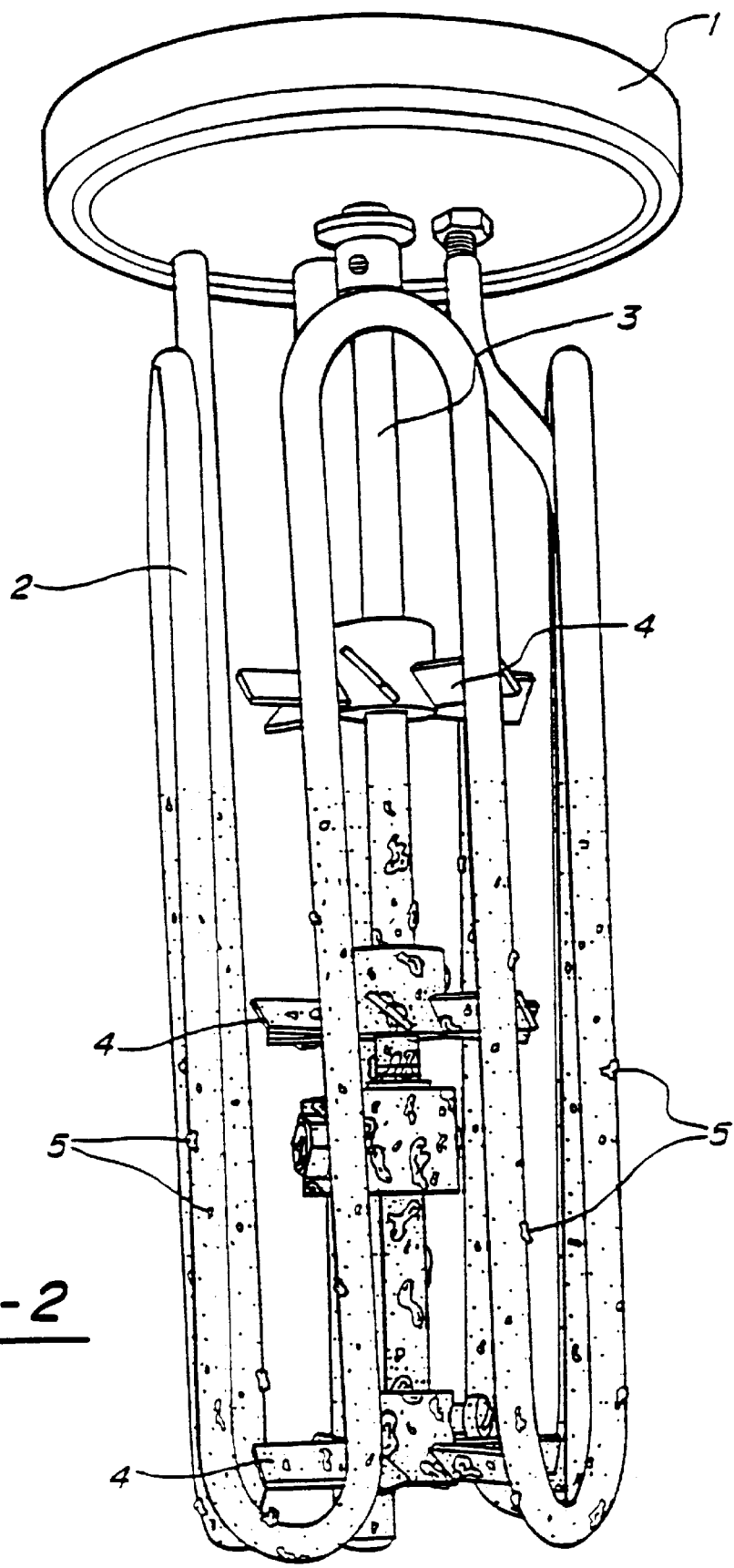
FIG. 2 shows the tar deposits on the reactor internals at the conclusion of the reaction described in Example 2.

The procedure as described in Example 1 was repeated, except that 2.3 grams of a mineral oil solution containing about 70 wt.% of an alkylated (with polypropene) benzene sulfonic acid with $\overline{M}_n$ of 500 and containing an average of about 30 total carbon atoms was charged to the autoclave reactor, in addition to the polybutene (700 grams) and the maleic anhydride (214.3 grams). The total system pressure increased from about 0 kPa (0 psig) to about 614 kPa (89 psig) after three hours reaction and to 897 kPa (130 psig) after six hours. The discharged reactor contents were stripped with nitrogen for one hour at 130° C. to remove unreacted maleic anhydride. The stripped product mixture (<0.1 wt.% maleic anhydride) had a saponification number of 171.3, a sediment content of 0.5 vol.%, kinematic viscosity at 100° C. of 64.62 cSt, and an ASTM D1500 color rating of greater than 8.0. The reactor had a slight to significant tar deposit covering more than 50% of its walls and internals. FIG. 2 is a drawing of the post-reaction reactor internals (including head 1, cooling water tube 2, and central stirrer shaft 3 having three turbine blades 4) subsequent to discharge of the reactor contents. FIG. 2 shows the slight to significant tar deposits 5 on the internals. 15.5 grams of tar residue was obtained from the reactor using the dissolution-evaporation-drying procedure described in Example 1.

Example 3

The procedure as described in Example 2 was repeated, except that a nitrogen partial pressure of about 449 kPa (65 psig) was applied before sealing the reactor. The total system pressure increased from 449 kPa (65 psig) to about 890 kPa (129 psig) after three hours reaction and then decreased to 704 kPa (102 psig) after six hours. The discharged reactor contents were stripped with nitrogen for one hour at 130° C. to remove unreacted maleic anhydride. The stripped product mixture (<0.1 wt.% maleic anhydride) had a saponification number of 177.6, a sediment content of 0.1 vol.%, kinematic viscosity at 100° C. of 73.58 cSt, and an ASTM D1500 color rating of 8.0. The reactor had a yellow to brown varnish on less than 25% of its walls and internals, with the balance having no observable tar. FIG. 3 is a drawing of the post-reaction reactor internals (including head 1, cooling water tube 2, and central stirrer shaft 3 having three turbine blades 4) subsequent to discharge of the reactor contents. FIG. 3 shows that the reactor internals are clean except for some varnish indicated by the shaded surfaces. 3.2 grams of tar residue was obtained from the reactor using the dissolution-evaporation-drying procedure described in Example 1.

Example 4

760 grams of a polybutene as described in Example 1, 233 grams of maleic anhydride, and 5 grams of a sulfonic acid mineral oil solution as described in Example 2 were charged to a 2-liter stainless steel Parr autoclave reactor, and then heated under a nitrogen blanket to 230° C. with stirring, after which a nitrogen partial pressure of about 449 kPa (65 psig) was applied and the reactor sealed. The reaction mixture was maintained with stirring at about 230° C. for eight hours, during which time the total system pressure increased to a maximum of about 1740 kPa (252 psig). The reactor was subsequently cooled to 130° C., the system pressure was vented, and the reactor contents discharged. After stripping the discharged reactor contents with nitrogen for one hour at 130° C. to remove unreacted maleic anhydride, the stripped product mixture containing less than 0.07 wt.% maleic anhydride was found to have a saponification number of 176.9, an Al of about 0.76, a sediment content of less than 0.005 vol.%, and an ASTM color rating of 6.0. The reactor had nil tar deposits; i.e., its walls and internals had no observable tar.

Example 5

2400 grams of a polybutene as in Example 1 and 5 grams of a sulfonic acid mineral oil solution as in Example 2 were charged to a stainless steel Baskerville autoclave reactor (5 liter capacity), and heated to 240° C. with stirring under a blanket of nitrogen. 766 grams of maleic anhydride were then added to the reactor and a nitrogen partial pressure of about 449 kPa (65 psig) was applied and the reactor sealed. The reaction mixture was maintained with stirring at about 240° C. for six hours, during which time the total system pressure increased to a maximum of about 2030 kPa (294 psig). The reactor was subsequently cooled to 130° C., the system pressure was vented, and the reactor contents discharged. After stripping the discharged reactor contents with nitrogen for one hour at 130° C. to remove unreacted maleic anhydride, the stripped product mixture containing less than 0.07 wt.% maleic anhydride was found to have a saponification number of 170.9, an AI of about 0.78, a sediment content of 0.1 vol.%, and an ASTM color rating of less than 5.0. The reactor had nil tar deposits; i.e., its walls and internals had no observable tar.

Examples 6 and 7

Example 6 was conducted using the same general procedure as described in Example 4, and Example 7 was conducted using the same general procedure as described in Example 5. The reaction parameters employed in these examples and the properties of the stripped product mixtures were as follows:

| Parameter | Example 6 | Example 7 |
|---|---|---|
| Polybutene $\overline{M}_n$ | 450 | 938* |
| Polybutene charge (g) | 800 | 3000 |
| Maleic anhydride charge (g) | 226.5 | 294 |
| Sulfonic acid (g) | 5.13 | 10.5 |
| Reaction temperature (°C.) | 230 | 230 |
| Reaction time (hrs) | 6 | 18 |
| Inert gas | carbon dioxide | nitrogen |
| Inert gas partial pressure (kPa gauge) | 690 | 505 |
| Maximum total system pressure (kPa gauge) | 2055 | 1185 |
| Residual maleic anhydride in stripped product (wt. %) | <0.1 | 0.2 |
| AI | 0.79 | 0.66 |
| SAP | 173.7 | 80.3 |
| Sediment (vol. %) | 0.09 | 0.012 |
| Tar deposit | No observable tar | Slight discoloration on <25% of reactor surfaces |

*The 938 $\overline{M}_n$ polybutene has less than about 10% terminal vinylidene content.

Example 8

In each of a series of three batch runs, maleic anhydride and 450 $\overline{M}_n$ polybutene were reacted in a 5-gallon stainless steel autoclave reactor in a mole ratio of maleic anhydride to polybutene of 1.3:1 at a reaction temperature of 220° C. and a nitrogen partial pressure of 449 kPa (65 psig) for six hours in the presence of 0.25 wt.% (based on the weight of polybutene and maleic anhydride) of the sulfonic acid mineral oil solution as described in Example 2, wherein the polybutene and sulfonic acid were charged to the reactor first and heated to about 200° C., followed by addition of the maleic anhydride while maintaining the temperature at about 200° C., application of the nitrogen partial pressure, and then heating to 220° C. The final total system pressures for the runs were 449 kPa (65 psig), 669 kPa (97 psig), and 704 kPa (102 psig) respectively. At the conclusion of each run, the reactor was cooled, vented to atmospheric pressure, and the reactor contents discharged. The discharged batches resulting from the second and third runs were stripped with nitrogen for 4 hours at 150° C. to reduce the unreacted maleic anhydride content to <0.2 wt.%. The first batch was not stripped due to difficulties with refluxing in the overhead system. After stripping, the second batch had SAP=166.5, and the third batch had SAP=161.8. Each of the stripped batches had a sediment content of <0.01 vol%. The runs were conducted over a period of five days with no cleaning of the reactor between runs. The reactor was completely free of tar at the conclusion of the third run except for a small black deposit approximately 0.32 cm in diameter near the reactor outlet.

Example 9

1250 grams of ethylene-butene-1 copolymer ($\overline{M}_n$=1713; ethylene content=44.9 wt.%; terminal vinylidene content= 62.9%), 92.3 grams of maleic anhydride, and 2.68 grams of a sulfonic acid mineral oil solution as described in Example 1 were charged to a 2-liter stainless steel Parr autoclave reactor, and then heated under a nitrogen blanket to 275° C. with stirring, after which a nitrogen partial pressure of about 517 kPa (75 psig) was applied and the reactor sealed. The reaction mixture was maintained with stirring at about 275° C. for four hours, during which time the total system pressure increased to a maximum of about 1738 kPa (252 psig). The reactor was subsequently cooled to 130° C., the system pressure was vented, and the reactor contents discharged. The resulting product mixture, after stripping with nitrogen to reduce the residual maleic anhydride to <0.1 wt.%, had a saponification number of 59.2, an AI of about 0.79, and a sediment content of 0.08 vol.%. The reactor had nil tar deposits; i.e., its walls and internals had no observable tar.

Example 10 (comparative)

1250 grams of ethylene-butene-1 copolymer ($\overline{M}_n$=2972; ethylene content=44.5 wt.%; terminal vinylidene content= 62%) and 61.82 grams of maleic anhydride were charged to a 2-liter stainless steel Parr autoclave reactor, and then heated under a nitrogen blanket to 230° C. with stirring, after which a nitrogen partial pressure of about 517 kPa (75 psig) was applied and the reactor sealed. The reaction mixture was maintained with stirring at about 230° C. for two hours, during which time the total system pressure increased to a maximum of about 1262 kPa (183 psig). The reactor was subsequently cooled to 130° C., the system pressure was vented, and the reactor contents discharged. The resulting product mixture, after stripping with nitrogen to reduce the residual maleic anhydride to <0.1 wt.%, had a saponification number of 35.5, an AI of about 0.61, and a sediment content of 6.0 vol.%. The reactor contained significant tar deposits covering more than 75% of the reactor surfaces.

What is claimed is:

1. A low tar, low sediment process for preparing a polyalkenyl derivative of a carboxylic acid producing compound selected from the group consisting of monounsaturated $C_3$ to $C_{10}$ monocarboxylic acid producing compounds and monounsaturated $C_4$ to $C_{10}$ dicarboxylic acid producing compounds, the process comprising the step of reacting the carboxylic acid producing compound with a polyalkene having a number average molecular weight of from about 300 to 5000 in the presence of a sediment-inhibiting amount of an oil soluble hydrocarbyl substituted sulfonic acid at a reaction temperature of from about 200 to 300° C. under an inert gas partial pressure in the range of from about 200 to 1000 kPa and in a mole ratio of carboxylic acid producing compound to polyalkene of from about 0.9:1 to 3:1.

2. The process according to claim 1, further comprising the steps of providing a mixture of the polyalkene and the oil soluble hydrocarbyl substituted sulfonic acid at reaction temperature, and then adding the carboxylic acid producing compound to the mixture while maintaining the mixture at reaction temperature.

3. The process according to claim 1, wherein the inert gas partial pressure is in the range of from about 400 to 700 kPa.

4. The process according to claim 1, wherein the reaction temperature is from about 225 to 245° C.

5. The process according to claim 1, wherein the polyalkene has no more than about 30% terminal vinylidene polymer chains.

6. The process according to claim 1, wherein the polyalkene has no more than about 15% terminal vinylidene polymer chains.

7. The process according to claim 1, wherein the hydrocarbyl substituted sulfonic acid is present in an amount of from about 0.05 to 1.0 weight percent based on the total weight of polyalkene and carboxylic acid producing compound.

8. The process according to claim 1, wherein the hydrocarbyl substituted sulfonic acid is an alkaryl sulfonic acid containing from about 24 to 40 carbon atoms per molecule.

9. The process according to claim 8, wherein the alkaryl sulfonic acid comprises an alkylated benzene sulfonic acid having a number average molecular weight in the range from about 475 to 600.

10. The process according to claim 1, wherein the carboxylic acid producing compound is a monounsaturated $C_4$ to $C_{10}$ dicarboxylic acid producing compound.

11. The process according to claim 10, the process being characterized by the substantial absence of tar formation and the polyalkenyl derivative being characterized by containing sediment in an amount of no more than about 0.1 volume percent.

12. The process according to claim 11, further comprising the steps of providing a mixture of the polyalkene and the oil soluble hydrocarbyl substituted sulfonic acid at reaction temperature, and then adding the monounsaturated dicarboxylic acid producing compound to the mixture while maintaining the mixture at reaction temperature.

13. The process according to claim 11, wherein the inert gas partial pressure is in the range of from about 400 to 700 kPa.

14. The process according to claim 11, wherein the reaction temperature is from about 225 to 245° C.

15. The process according to claim 11, wherein the polyalkene has no more than about 30% terminal vinylidene polymer chains.

16. The process according to claim 11, wherein the polyalkene has no more than about 15% terminal vinylidene polymer chains.

17. The process according to claim 11, wherein the hydrocarbyl substituted sulfonic acid is present in an amount of from about 0.05 to 1.0 weight percent based on the total weight of polyalkene and monounsaturated dicarboxylic acid producing compound.

18. The process according to claim 11, wherein the hydrocarbyl substituted sulfonic acid is an alkaryl sulfonic acid containing from about 24 to 40 carbon atoms per molecule.

19. The process according to claim 18, wherein the alkaryl sulfonic acid comprises an alkylated benzene sulfonic acid having a number average molecular weight in the range from about 475 to 600.

20. The process according to claim 11, wherein the monounsaturated dicarboxylic acid producing compound comprises maleic anhydride.

21. The process according to claim 11, wherein the polyalkene is selected from the group consisting of polybutene and polyisobutylene.

22. The process according to claim 21, wherein the polyalkene has no more than about 30% terminal vinylidene polymer chains.

23. The process according to claim 22, wherein the monounsaturated dicarboxylic acid producing compound comprises maleic anhydride.

* * * * *